US006577425B1

(12) United States Patent
Martinelli et al.

(10) Patent No.: US 6,577,425 B1
(45) Date of Patent: Jun. 10, 2003

(54) OPTICAL DEVICE FOR PROCESSING A SEQUENCE OF BITS

(75) Inventors: Mario Martinelli, San Donato Milanese (IT); Guido Alberto Maier, Segrate (IT); Lorenzo Ghioni, Casalmaiocco (IT); Achille Pattavina, Milan (IT)

(73) Assignee: Corning Photonic Technologies Inc., Corning, NY (US)

( * ) Notice: Subject to any disclaimer, the term of this patent is extended or adjusted under 35 U.S.C. 154(b) by 0 days.

(21) Appl. No.: 09/397,639

(22) Filed: Sep. 16, 1999

Related U.S. Application Data
(60) Provisional application No. 60/101,098, filed on Sep. 18, 1998.

(30) Foreign Application Priority Data

Sep. 17, 1998 (EP) .............................................. 98203132

(51) Int. Cl.[7] .............................................. H04B 10/00
(52) U.S. Cl. ........................ 359/165; 370/392; 370/406
(58) Field of Search .............................. 359/165, 137; 370/389, 395.1, 392, 404, 405, 406

(56) References Cited

U.S. PATENT DOCUMENTS

| 5,394,394 | A | * | 2/1995 | Crowther et al. ........... 370/392 |
| 5,541,913 | A | | 7/1996 | Witters et al. |
| 5,570,362 | A | * | 10/1996 | Nishimura ................... 370/395 |
| 5,912,753 | A | * | 6/1999 | Cotter et al. ................ 359/137 |
| 6,256,292 | B1 | * | 7/2001 | Ellis et al. ................... 370/227 |
| 6,282,197 | B1 | * | 8/2001 | Takahashi et al. ........... 370/395 |
| 6,301,257 | B1 | * | 10/2001 | Johnson et al. .............. 370/406 |
| 6,327,261 | B1 | * | 12/2001 | Makoua et al. .............. 370/392 |

FOREIGN PATENT DOCUMENTS

EP    0 926 783 A1    6/1999

OTHER PUBLICATIONS

Jeon, M. Y. et al., "Implementation of a Peak Cell Rate Policer using the Virtual Scheduling Algorithm", IEEE International Conference on Communications, vol. 2, p. 762–766, (1996).
Tsushima, H. et al. "Demonstration of an Optical Packet Add/Drop with Wavelength–Coded Header", IEEE Photonics Technology Letters, vol. 7, No. 2, p. 212–214, (1995).
Tsukada, M. et al., "An Ultrafast Photonic ATM Switch Based on Bit–Interleave Multimplexing", IEEE, Journal of Lightwave Technology, vol. 14, No. 9, p. 1979–1985, (1996).

* cited by examiner

Primary Examiner—John Tweel
(74) Attorney, Agent, or Firm—Ronald J. Paglierani

(57) ABSTRACT

An optical selector for an asynchronous transfer mode (ATM) optical network, the said selector being capable of selecting ATM cells of bits having a frequency of arrival f less than or equal to a predetermined frequency (PCR), the said optical selector comprising:
  an input having a first device capable of blocking the entry of bits;
  an output having a second device capable of permitting the outflow of bits;
  an ATM cell recognition unit constructed in such a way that it recognizes the headers of ATM cells and connected to the said input and to the said output for the transit of bits from the said input to the said output; and
  an optical decision unit connected operationally to the said first device, to the said second device and the said ATM cell recognition unit.

14 Claims, 11 Drawing Sheets

OPTICAL DEVICE FOR PROCESSING A SEQUENCE OF BITS

CROSS-REFERENCE TO RELATED APPLICATIONS

This application is based on European Patent Application No. 98203132.0 filed on Sep. 17, 1998 and U.S. Provisional Application No. 60/101,098 filed on Sep. 18, 1998, the content of which is incorporated hereinto by reference.

BACKGROUND OF THE INVENTION

1. Field of the Invention

The present invention relates to an optical selector and a method for selecting ATM cells having a frequency of arrival, f, less than or equal to a predetermined frequency.

2. Technical Background

At the present time, in telecommunications networks, optical technology is predominantly used for the transmission of optical signals in which use is made of the known wideband properties offered by optical fibres, while the operations of processing the optical signals, such as multiplication and switching, are carried out by means of opto-electronic devices.

However, opto-electronic devices have the known disadvantages of electronic circuits which are becoming bottlenecks in optical communications systems and in optical networks. This is because electronic devices have a narrow bandwidth compared with the optical band available in optical communications systems, and are generally based on a relatively slow serial processing of the signals.

Research is therefore being increasingly directed towards the possibility of using optics not only for the transmission of signals but also for their processing. This is due to the fact that, potentially, wholly optical devices have a wide bandwidth and are transparent to the bit rate, the format and the code of the transmission.

In the switching nodes of an optical network, where multiple communication channels converge and originate, there is a widely felt need for devices capable of carrying out wholly optical operations on sequences of bits (cells).

For example, an important operation in known asynchronous transfer mode (ATM) networks, which use a method of statistical multiplexing of data packets originating from separate sources, is that of checking the frequency of the cells (peak cell rate, PCR) arriving at the input of a network.

ATM is a transmission method which consists in grouping the data transmitted from various sources into packets of digital data (cells), each of which consists of a payload of 43 bytes and a header of 5 bytes. The header comprises various fields containing various data used by the nodes of the ATM network to control the switching of the cells. This transmission method also provides a negotiation of the cell transmission frequency (PCR) before the opening of a connection between a source and an ATM network or between two different ATM networks.

The PCR check has to be carried out both at the point at which the traffic sources have access to an ATM network and at points of interconnection between different ATM networks, and consists in checking that each source or network does not generate cells at a frequency (f) greater than that negotiated, in other words greater than the frequency (PCR) which has been assigned to it by the network to which it is connected.

However, in the case to which the present description and claims relate, the expression "ATM network" is not used in the limiting sense but also comprises all the systems which, like the conventional ATM, are based on a negotiation of the cell frequency before the opening of a predetermined connection.

The "virtual scheduling algorithm" (VSA) is one of the standard algorithms included in ITU-T Recommendation I.371, for PCR checking in ATM networks. This algorithm requires that, at the moment at which a new cell relating to a given connection between two ATM nodes arrives at one of the said access or interconnection points, a device ("policer") capable of controlling the traffic in this network calculates the time elapsed since the transit of the last cell and that, if this time is less than a time $T_{PCR}$ equal to the inverse of the PCR ($T_{PCR}=1/PCR$), the new cell must be rejected.

There are known electronic devices for implementing the VSA.

U.S. Pat. No. 5,541,913 describes a PCR checking device comprising a plurality of processors in parallel, each of which implements a modified virtual scheduling algorithm and thus generates conformity signals for a cell for which an activation circuit has been activated. From these conformity signals, a plurality of which may be provided for each cell of the incoming ATM flow, an arbitration module generates a discharge signal, which indicates whether this cell must or must not be included in an output flow from a discharge circuit, and feedback signals, which indicate to a corresponding processor whether or not to carry out an update, already provided, of the specified arrival time used in the aforesaid algorithm. The architecture of the device permits the implementation of any check method by means of an adaptation of the arbitration module and of the activation circuit.

Man-Yeong Jeon et al. ["Implementation of a Peak Cell Rate Policer using the Virtual Scheduling Algorithm", Proceedings of IEEE ICC '96, Dallas, Tex., USA, p. 762–766 (1996)] describe the architecture of a checking device which implements the VSA to check the PCR and discuss some problems relating to its implementation. They also illustrate some experimental results obtained for various values of PCR, to demonstrate that the device carries out its checking function in a satisfactory way.

However, there are no known optical devices for implementing a policer for checking the PCR in ATM networks.

SUMMARY OF THE INVENTION

A first aspect of the present invention is therefore an optical selector for an ATM optical network, the said selector being capable of selecting ATM cells of bits having a frequency of arrival, f, less than or equal to a predetermined frequency (PCR), the said optical selector comprising:

an input having a first device capable of blocking the entry of bits;

an output having a second device capable of permitting the outflow of bits;

an ATM cell recognition unit constructed in such a way that it recognizes the headers of ATM cells and connected to the said input and to the said output for the transit of bits from the said input to the said output; and an optical decision unit connected operationally to the said first device, to the said second device and to the said ATM cell recognition unit.

In the course of the present description and of the attached claims, the expression "optical decision unit" is used to indicate a device which, having received an optical impulse at its input., is capable of supplying two optical impulses at the output, for example two optical control impulses, in which each output optical impulse has a predetermined temporal phase shift with respect to an input optical impulse and also having a predetermined duration.

Preferably, the said first device consists of a first optical gate. More preferably, the said first optical gate is in the open state when it is in normal operating conditions.

Preferably, the said second device consists of a second optical gate. More preferably, the said second optical gate is in the closed state when it is in normal operating conditions.

Advantageously, the said ATM cell recognition unit is an optical device capable of sending an optical impulse to the said optical decision unit when it recognizes the header of an ATM cell.

Preferably, the said optical decision unit processes the said optical impulse to supply a first optical control signal for the said first device, the said first optical control signal being capable of changing the state of the said first optical gate from open to closed for a time substantially equal to T, starting from when a time substantially corresponding to the duration $T_C$ of an ATM cell has elapsed since the recognition of the header of an ATM cell. Additionally, the said optical decision unit processes the said optical impulse to supply a second optical control signal for the said second device, the said second optical control signal being capable of changing the state of the said second optical gate from closed to open for a time substantially equal to the duration $T_C$ of an ATM cell, starting from the time of recognition of the header of an ATM cell by the said ATM cell recognition unit.

Preferably, the said optical decision unit also comprises a first output for the said first optical control signal connected to the said first device. More preferably, the said optical decision unit also comprises a second output for the said second optical control signal connected to the said second device.

A second aspect of the present invention is therefore a method for selecting ATM cells of bits having an arrival frequency, f, less than or equal to a predetermined frequency (PCR), the said method comprising:

a) the input of bits through suitable open input means, b) the passage of the said bits through an ATM cell recognition unit capable of recognizing the headers of ATM cells, towards suitable closed output means;

c) the sending of a command, when the header of an ATM cell is recognized by the said ATM cell recognition unit,
  i) for the opening of the said output means for a time substantially equal to the duration ($T_C$) of an ATM cell and, at the end of this time $T_C$,
  ii) for the closing of the said input means for a time $T=1/PCR-T_C$ d) the maintenance of the initial state, if the header of an ATM cell is not recognized by the said ATM cell recognition unit, in such a way that the said input means remain open for the input of an ATM cell and the said output means remain closed, thus eliminating the bits which have entered and whose header has not been recognized.

Preferably, the step c) also comprises providing a first optical control impulse for the said output means and a second optical control impulse for the said input means.

Advantageously, the said first optical control impulse has a duration substantially equal to $T_C$, starting from the moment of recognition of the header of an ATM cell.

More advantageously, the said second optical control impulse has a duration substantially equal to T, starting from the moment when a time substantially equal to $T_C$ has elapsed since the recognition of the header of an ATM cell.

BRIEF DESCRIPTION OF THE DRAWINGS

Characteristics and advantages of the invention will now be illustrated with reference to embodiments represented by way of example and without restriction in the attached figures, in which:

FIG. 9 is a schematic representation of the operation of the optical selector shown in FIG. 1;

DETAILED DESCRIPTION OF THE PREFERRED EMBODIMENTS

Figure 1:
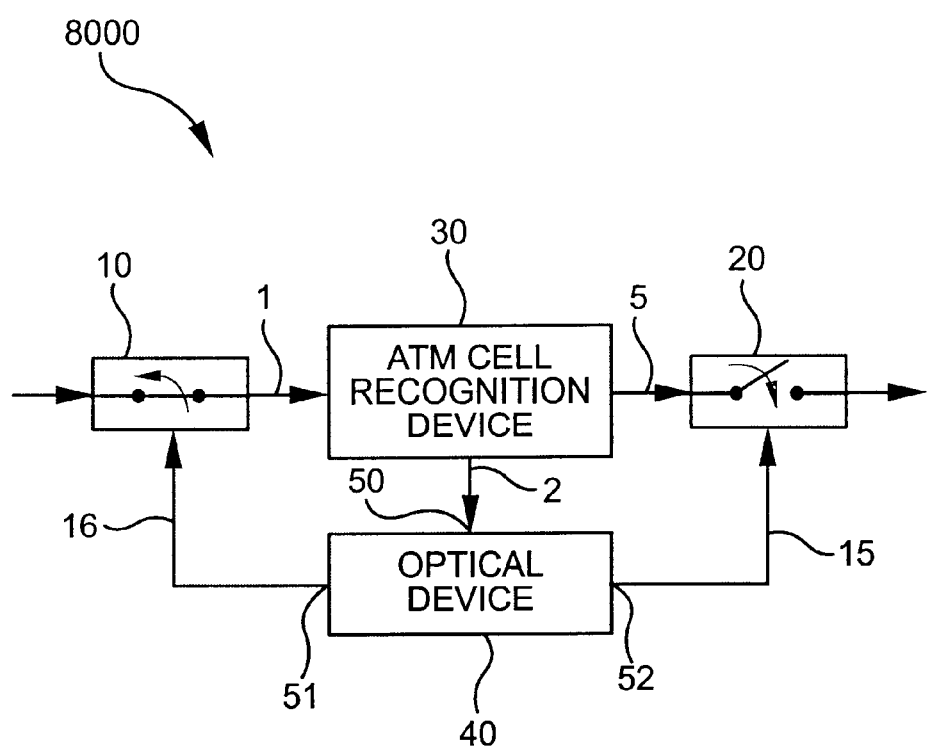
FIG. 1 is a schematic representation of an optical selector according to the invention.

According to the embodiment shown in FIG. 1, the optical selector 8000 comprises an optical input gate 10, an optical output gate 20, a cell recognition unit 30 and an optical decision unit 40 connected in a loop structure consisting of 5 optical connections 1, 2, 5, 15 and 16.

Preferably, the said optical connections 1, 2, 5, 15 and 16 consist of conventional optical fibres or waveguides.

Typically, an optical gate is a device having an input and an output for an optical signal in transit and at least one input for at least one control signal capable of changing the normal state of the said gate. More particularly, the said at least one control signal closes a gate which is normally open, or vice versa.

Figure 3:
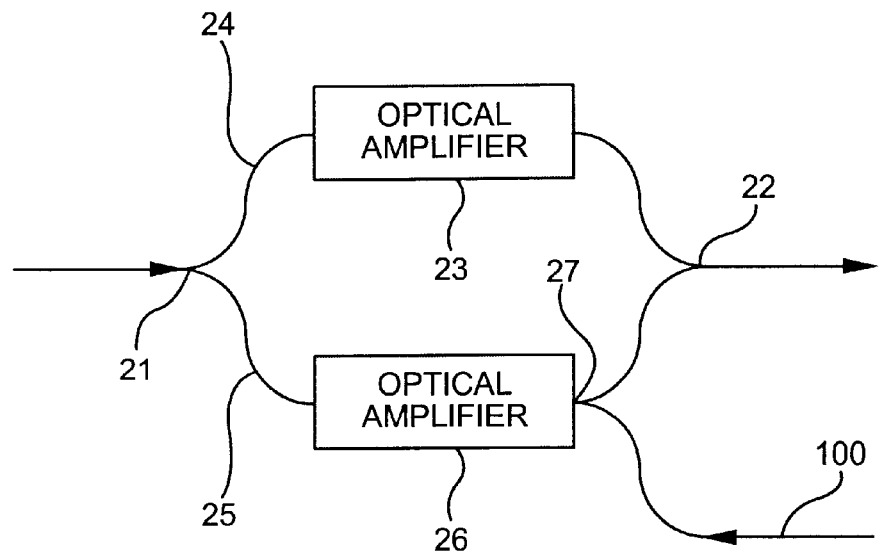
FIG. 3 is a schematic representation of an embodiment of an optical gate of the optical selector shown in FIG. 1.

The optical input gates 10 and output gates 20 consist, for example, of conventional interferometers of the Mach-Zehnder type. As illustrated in FIG. 3, each gate comprises a 1×2 input coupler 21, a 2×1 output coupler 22, a 2×1 coupler 27 for an optical control signal 100, a first optical propagation path 24 and a second optical propagation path 25, and a first optical amplifier 23 and a second optical amplifier 26. The said optical amplifiers 23 and 26 are conventional optical amplifiers, for example of the fibre type doped with rare earths or of the semiconductor type. In the illustrated embodiment, they are of the semiconductor type. Preferably, the said couplers 21, 22 and 27 are conventional 50/50 (3 dB) directional couplers made from optical fibres or waveguides. Alternatively, a conventional optical circulator (not shown) may be used in place of the said coupler 27 for the optical control signal 100. The input coupler 21 divides an input optical signal into two signals having substantially the same intensity, which pass along the two paths 24 and 25 of the interferometer. Each of the optical paths 24 and 25 preferably consists of an optical fibre or a waveguide. The first optical semiconductor amplifier 23 is connected in the first path 24, while the second optical semiconductor amplifier 26 is connected in the second path 25.

The amplifiers 23 and 26 are conventional optical semiconductor amplifiers, each consisting, for example, of an active InGaAsP waveguide surrounded by a shell of InP. By regulating the supply current of the said optical semiconductor amplifiers or by illuminating the active waveguide with a predetermined optical control signal, it is possible to vary the density of the charge carriers inside the said active waveguide and, consequently, its refractive index.

The supply current of the optical semiconductor amplifiers of the optical gate 10 is regulated in such a way as to impart a phase delay of 0° or 360° ($2\pi$) to the optical signals propagated in the optical paths 24 and 25. In this way they interfere constructively in the output coupler 22 and the optical gate 10 is open (allowing the passage of the optical signal). On the other hand, the supply current of the optical semiconductor amplifiers of the optical gate 20 is regulated in such a way as to impart a phase delay of 180° ($\pi$) to the optical signals propagated in the optical paths 24 and 25. In this way, they interfere destructively in the output coupler 22, and the optical gate 20 is closed (blocking the passage of the optical signals).

Consequently, in normal operating conditions (in the absence of a control signal) the input gate 10 is in an open state, while the output gate 20 is in a closed state. On the other hand, in the presence of a control signal 100 (supplied to the amplifier 26 by the said third coupler 27) having a suitable intensity and wavelength, the optical signals in the two optical paths 24 and 25 are phase shifted again and the state of the optical gate 10 thus changes from open to closed and that of the optical gate 20 changes from closed to open.

Additionally, the gain of the said optical semiconductor amplifiers 23 and 26 is regulated in such a way that, at the input of the said output coupler 22, the optical signals originating from the two guided optical paths 24 and 25 have the same intensity.

According to one embodiment, an optical filter (not shown) is connected at the output of the coupler 22 to filter the ASE (Amplified Spontaneous Emission) generated by the optical amplifiers 23 and 26 and to reduce the quantity of noise transmitted to the following stages. The said optical filter may be of the interference type such as a conventional reference filter, a Mach-Zehnder filter, an interference grating or a diffraction grating.

Alternatively, the said gates may be made by connecting a single optical semiconductor amplifier directly along the optical path of the input signal. According to this embodiment, the gate is closed by means of an optical control signal having a wavelength and intensity such that the optical amplifier is saturated, thus preventing a further optical signal at the input of the amplifier from being transmitted to its output.

According to a preferred embodiment, the cell recognition unit 30 is a wholly optical device capable of recognizing the header of an ATM cell at its input. The said device allows the ATM cells of bits reaching its input from the optical fibre connection 1 to pass to the optical fibre connection 5, and, when it recognizes that the header of an ATM cell is present at its input, sends an optical control impulse 222 along the optical fibre connection 2 for the optical decision unit 40. For example, European Patent Application No. 97201988.9 in the name of the applicant describes a wholly optical device (not shown) which generates an output optical impulse when it recognizes a predetermined sequence of bits (the header of an ATM cell) at its input. The said device comprises a series-parallel converter for converting a series of N bits (a cell) into a corresponding spatial pattern of N bits carrying the same information;

optical means for generating, from the said spatial pattern of N bits, a first two-dimensional image consisting of N rows and M columns;

optical means for carrying out a logical AND operation between the elements of the said first two-dimensional image and those of a predetermined second two-dimensional image, having N rows and M columns, and for generating in this way a third two-dimensional image having N rows and M columns;

means for carrying out a logical XOR operation between the elements of each column of the said third two-dimensional image, and for generating in this way a second parallel pattern with M bits;

means for carrying out a logical OR operation between the bits of the said second parallel pattern with M bits, and for generating in this way the said output optical impulse.

Figure 2:
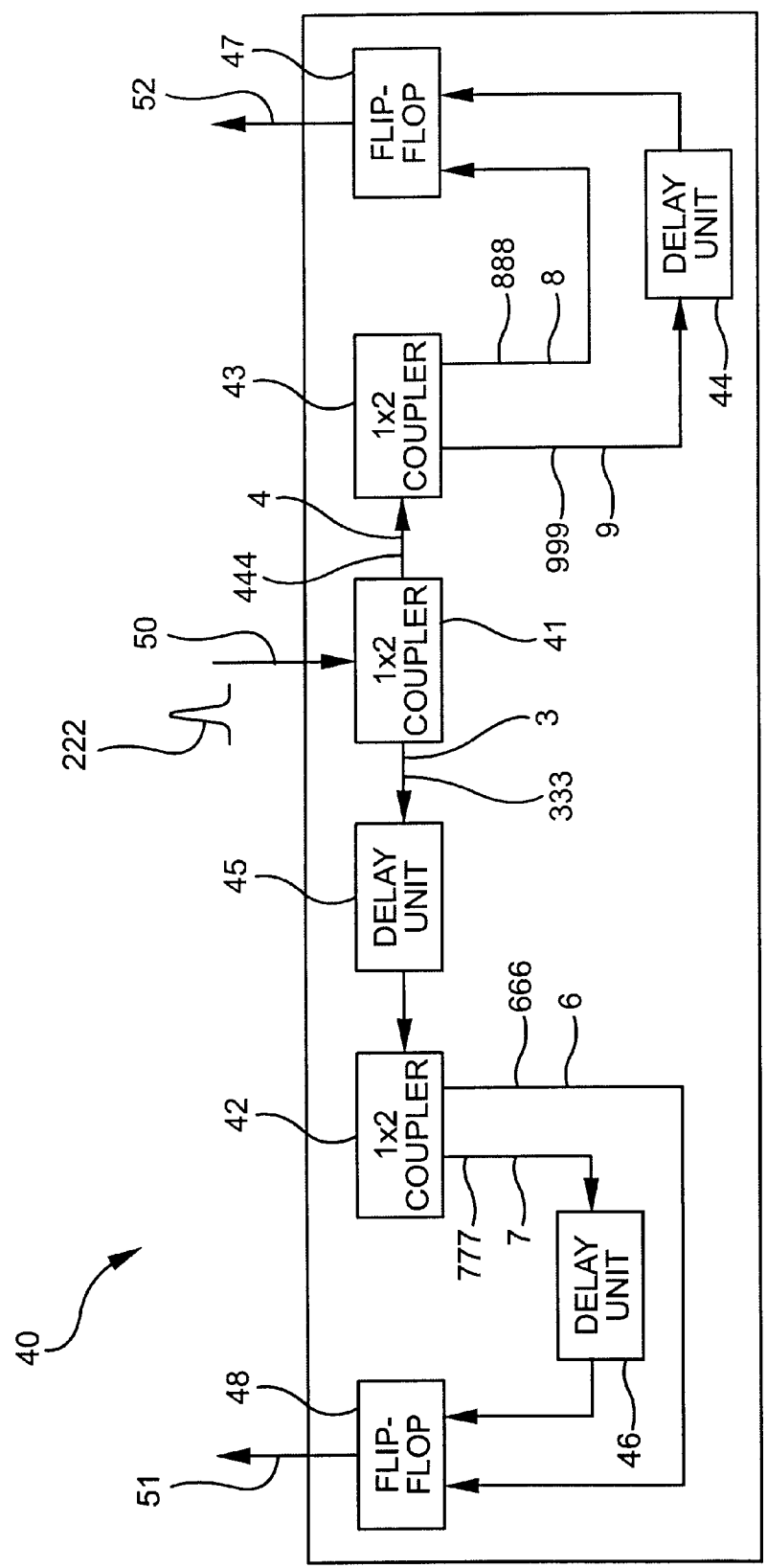
FIG. 2 is a schematic representation of an optical decision unit applicable in the embodiment of the optical/selector shown in FIG. 1.

According to the embodiment shown in FIG. 2, the optical decision unit 40 comprises a first 1×2 coupler 41, a second 1×2 coupler 42 and a third 1×2 coupler 43, a first delay unit 44, a second delay unit 45 and a third delay unit 46, a first flip-flop 47 and a second flip-flop 48, and suitable connections 3, 4, 6, 7, 8, 9. The input of the first coupler 41 forms the input 50 of the optical device 40, the output of the flip-flop 48 forms its first output 51 and the output of the flip-flop 47 forms its second output 52.

Each of the connections 3, 4, 6, 7, 8, 9 is preferably made from a conventional optical fibre or waveguide.

The couplers 41–43 are conventional couplers. Preferably, they are 50/50 (3 dB) directional couplers.

Figure 4:
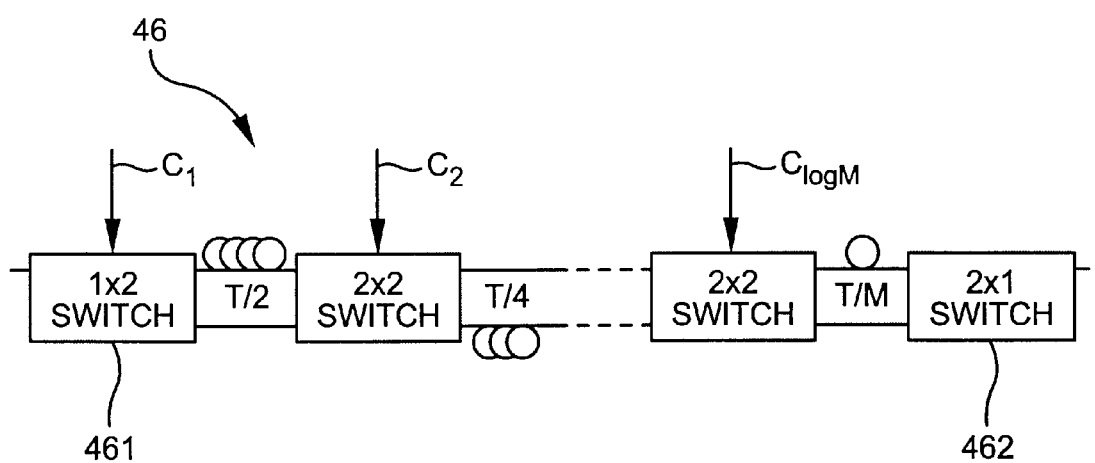
FIG. 4 is a schematic representation of a first embodiment of a variable delay unit of the optical decision unit shown in FIG. 2.

The delay units 44 and 45 are, typically, constant delay units, in which there is a fixed and non-modifiable time interval between the moment at which the signal appears at their input and that at which the same signal begins to be available at the output, while the unit 46 is preferably of the variable delay type, in other words one in which the said time interval is modifiable. The constant delay units 44 and 45 are made, for example, from a section of optical fibre having a length L=v*T, where T is the delay which is to be obtained and v (v=c/n) is the velocity c of light inside an optical fibre having a refractive index n. According to the embodiment shown in FIG. 4, the variable delay unit 46 consists of a 1×2 input switch 461, a 2×1 output switch 462 and a certain number of 2×2 switches, disposed in series between the two input and output switches 461 and 462. The input switch 461 has one input and two outputs connected, respectively, to a predetermined optical fibre delay line and to a section of optical fibre of negligible length (which introduces a negligible delay in an optical signal passing through it). The i-th switch has two inputs, one for a predetermined optical fibre delay line and the other for a section of fibre of negligible length, and two outputs connected to a further predetermined delay line and to a further section of fibre of negligible length. Finally, the output switch 462 has two inputs, for a predetermined delay line and a section of fibre of negligible length respectively, and one output.

To enable M different delays to be provided, the unit 46 preferably consists of a number, equal to $\log_2 M$, of switches connected in series, including the input switch 461, in addition to the output switch 462. Additionally, the predetermined optical fibre delay line connected to the output of the i-th switch preferably has a length such that it causes a delay equal to $T/2^i$ ($1 \leq i \leq \log_2 M$) in the signal in transit.

The switches in series are controlled by suitable control signals $c_1$–$c_{log2M}$ which determine the path of the signal in transit along the delay lines and/or along the sections of fibre of negligible length and, consequently, the delay applied to this signal in transit. This is because the signal arriving at one of the two inputs of the switch is sent to one output rather than to another, according to the presence or absence of the control signal.

Typically, a switch is a device having at least one input, at least two outputs for a signal in transit and at least one input for at least one control signal. In the absence of the control signal, the input signal leaves the device through one of the said outputs, while in the presence of the control signal the signal is switched to another of the said outputs.

Figure 8:
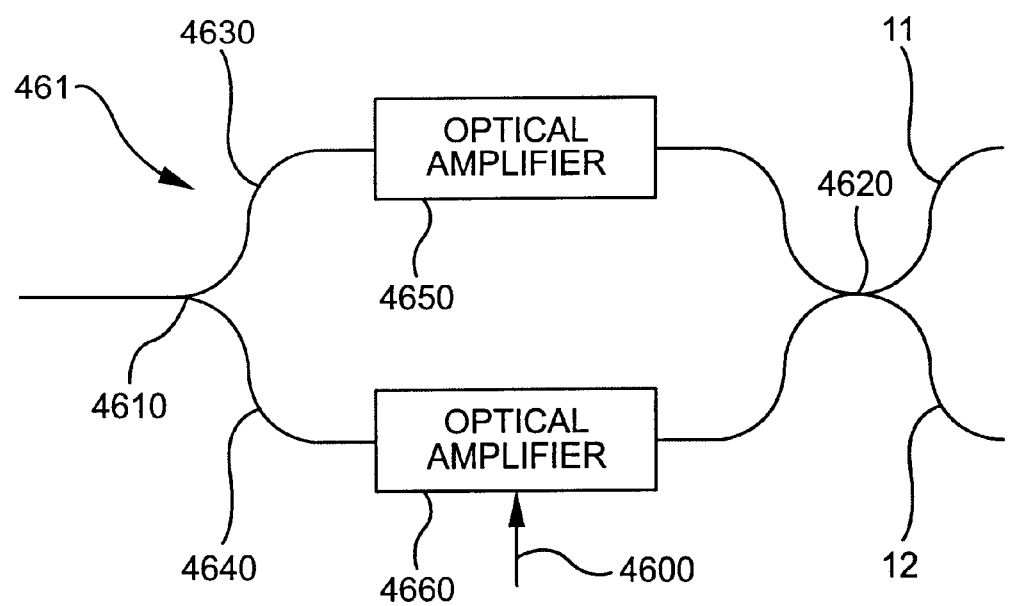
FIG. 8 is a schematic representation of an optical switch included in the variable delay unit shown in FIG. 4.
Figure 9A:
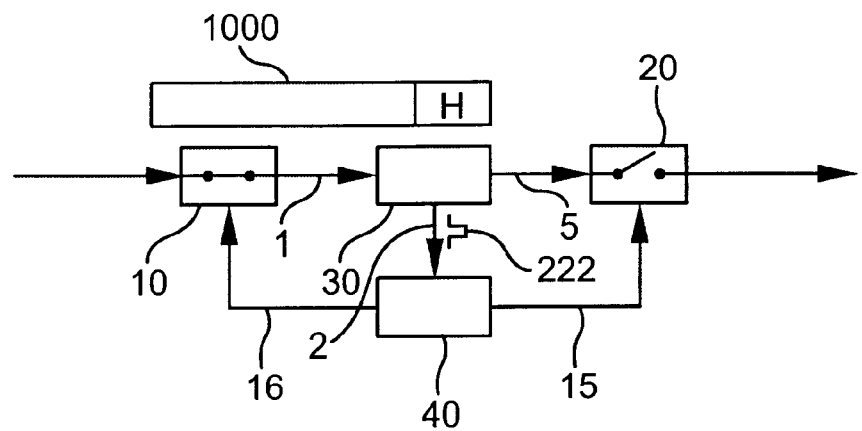
FIGS. 9(a) through 9(d) are schematic representations of the operation of the optical selector shown in FIG. 1.
Figure 9B:
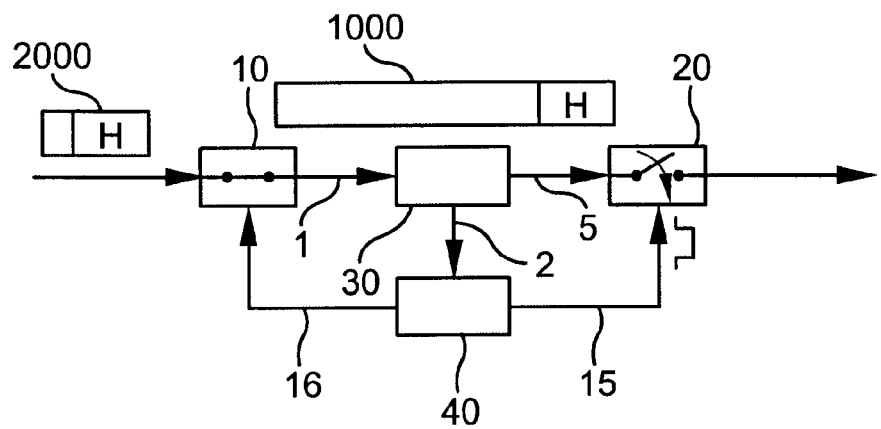
Figure 9C:
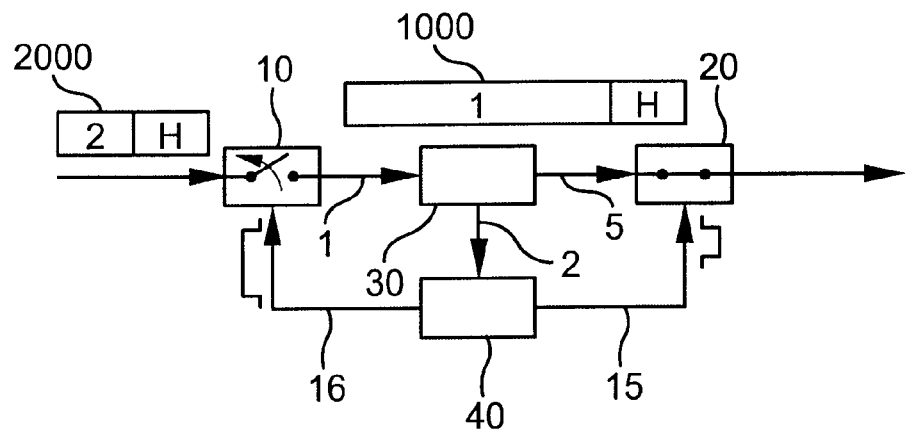
Figure 9D:
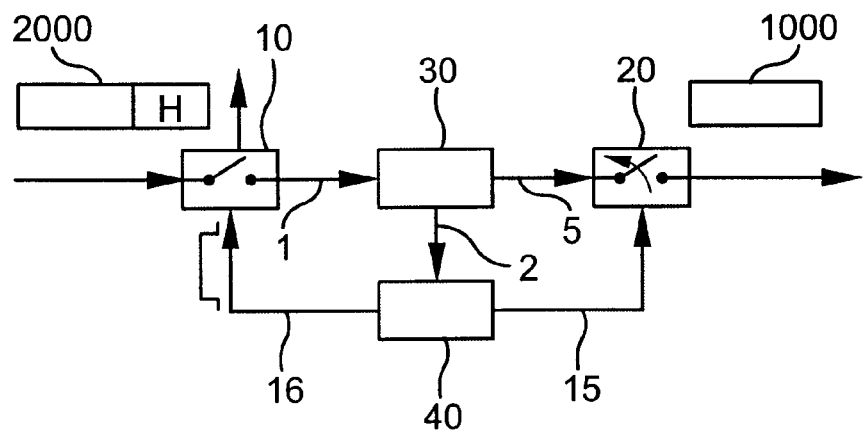

The said switch may consist of a device having a conventional interferometric structure of the Mach-Zehnder type. FIG. 8 shows, for example, the 1×2 input switch 461. This comprises an input coupler 4610, an output coupler 4620, two guided optical paths 4630 and 4640, and two outputs 11 and 12. In turn, each of the two guided optical paths 4630 and 4640, preferably consisting of optical fibres or waveguides, comprises a conventional optical amplifier 4650 and 4660 respectively and, for the amplifier 4660, an electrical control signal 4600. The said optical amplifiers 4650 and 4660 are, for example, of the type consisting of optical fibres doped with rare earths or of the semiconductor type. The couplers 4610 and 4620 are conventional couplers. Preferably, they are directional 50/50 couplers consisting of optical fibres or waveguides (3 dB).

According to one embodiment, the amplifiers 4650 and 4660 are conventional optical semiconductor amplifiers, each consisting of an active InGaAsP waveguide surrounded by a shell of InP. By regulating the supply current of the said optical semiconductor amplifiers or by illuminating the active waveguide with a predetermined optical control signal, it is possible to vary the density of the charge carriers inside the said active waveguide and, consequently, its refractive index. For the construction of the switch 461, the supply current of the said optical amplifiers 4650 and 4660 is regulated in such a way that the signals propagated in the two optical paths 4630 and 4640 interfere constructively in the output 11 and destructively in the output 12. Conversely, the electrical control signal 4600 is selected in such a way as to make the signals propagated in the two optical paths 4630 and 4640 interfere constructively in the output 12 and destructively in the output 11. In this way, in the absence of an electrical control signal 4600 (in normal operating conditions), an optical signal at the input of the switch is switched to the output 11 while, in the presence of the electrical control signal 4600, it is switched to the output 12. Additionally, the gain of the said optical semiconductor amplifiers 4650 and 4660 is regulated in such a way that at the input of the said output coupler 4620 the optical signals originating from the two guided optical paths 4630 and 4640 have the same intensity.

Alternatively, as seen previously in the case of the optical gates 10 and 20, the control signal 4600 may be optical.

Figure 5A:
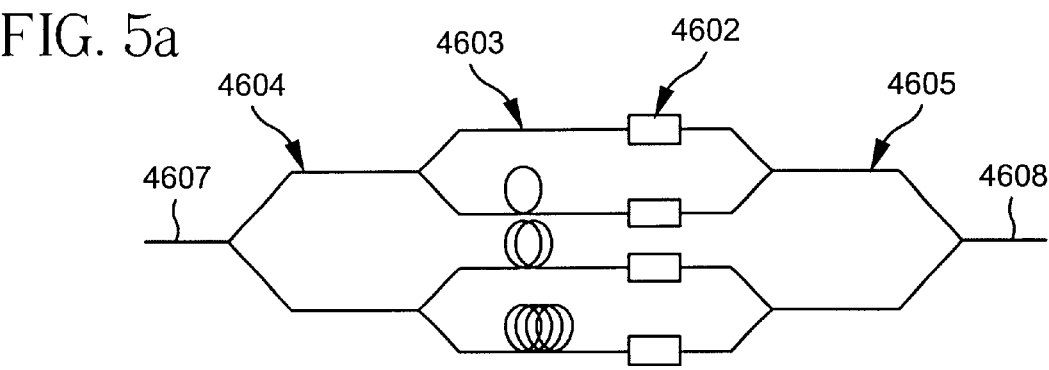
FIG. 5 is a schematic representation of four variants (FIGS. 5a–5d) of a second embodiment of a variable delay unit of the optical decision unit shown in FIG. 2.
Figure 5B:
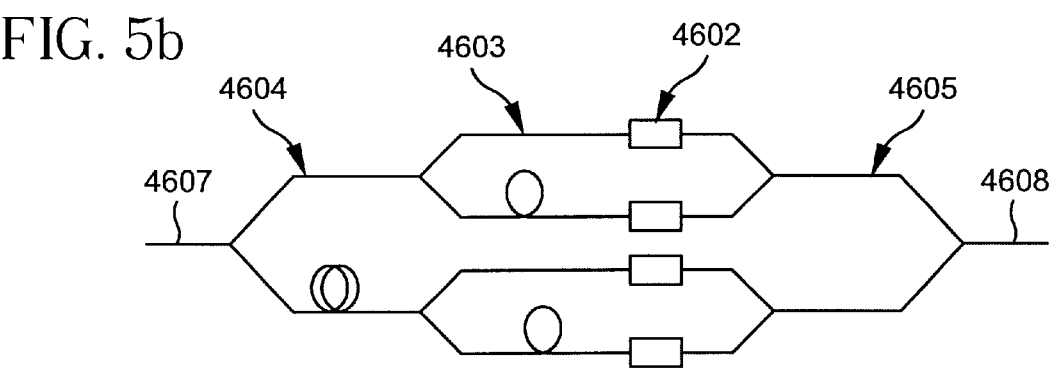

According to a second embodiment, the variable delay unit 46 consists of a conventional tree structure such as that shown in FIGS. 5a–5d. This structure comprises an input 4607, a plurality of sections of optical fibre (indicated as a whole by the number 4603 in FIG. 5), each having a predetermined length, and an output 4608. In FIGS. 5a and 5b, conventional beam splitters (for example, 1×2 directional couplers in series, indicated as a whole by the number 4604 in FIGS. 5a and 5b) repeatedly divide an input optical signal and transmit it in the various sections of optical fibre 4603. The outputs of these sections of optical fibre 4603 are then coupled by suitable couplers (for example, 2×1 couplers in series, indicated as a whole by the number 4605 in FIG. 5) to return to a single optical fibre at the output 4608. Optical gates (indicated as a whole by the number 4602 in FIGS. 5a and 5b) are present at the outputs of the various sections of optical fibre 4603, only the gate corresponding to the signal delayed by the desired quantity being open (allowing the signal to pass), while the others are closed (blocking the passage of the signal). The said optical gates 4602 consist, for example of conventional interferometers of the Mach-Zehnder type as illustrated in FIG. 3.

Figure 5C:
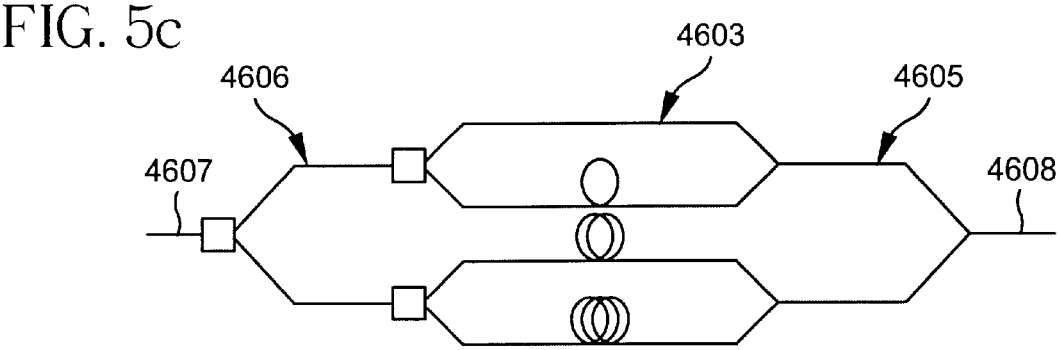
Figure 5D:
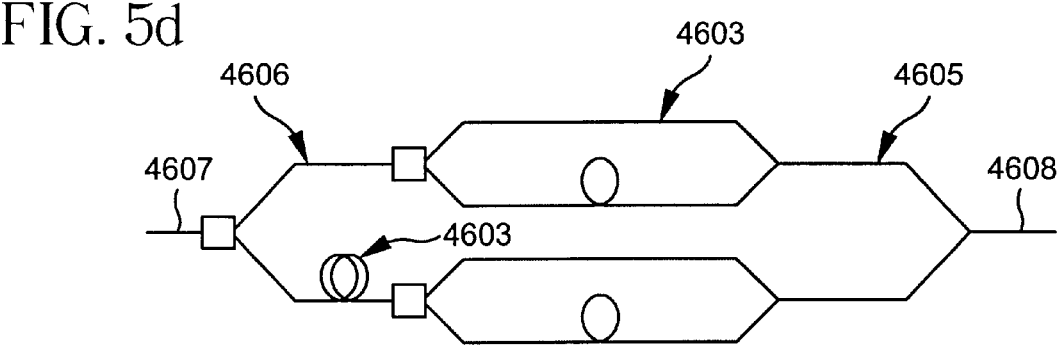

Alternatively, as shown in FIGS. 5c and 5d, in place of the said beam splitters 4604 it is possible to connect 1×2 switches (indicated as a whole by the number 4606 in FIGS. 5c and 5d) which from time to time direct the input signal, according to the delay which is to be imparted to it, into different sections of optical fibre 4603. The said switches 4606 may be, for example, of the type described previously and shown in FIG. 8.

Figure 6:
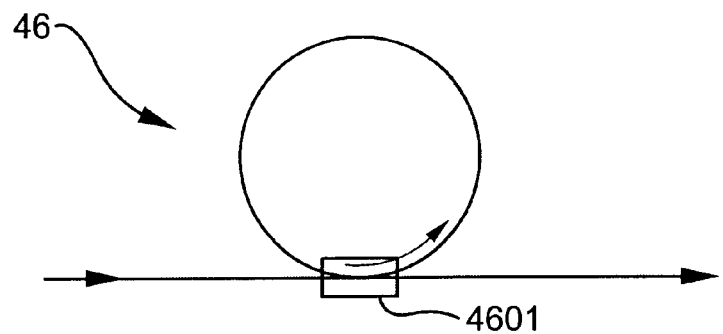
FIG. 6 is a schematic representation of a third embodiment of a variable delay unit of the optical decision/unit shown in FIG. 2.

According to a third embodiment, the variable delay unit 46 has a structure of the loop type, as shown in FIG. 6. In this type of structure, the input optical signal is delayed by making it circulate for a predetermined number of times in a loop. Preferably, the said loop consists of an optical fibre having a predetermined length according to the delay which is to be obtained. The signal is then collected at the output by means of a 2×2 switch 4601 (of the type shown in FIG. 8, for example) which has the function of inserting the signal into the said optical fibre loop and of extracting it at the output of the loop.

Typically, the optical flip-flops 47 and 48 are two-state devices which remain in one state or another until a signal causing the transition from one state to the other is applied to them. For example, there are conventional optical devices of the Set-Reset (SR) type with two inputs and one output, in which an optical set impulse at one of the two inputs sets the state of the output to 1 (emission of an output optical signal) and a reset optical impulse at the other input sets the state of the output to 0 (absence of an output optical signal). The output of the device remains in the state 1 until an optical reset impulse causing the transition from the state 1 to the state 0 is applied to one of the two inputs. In turn, the output remains in the state 0 until an optical set impulse causing the transition from the state 0 to the state 1 is applied to the other of the two inputs.

Figure 7:
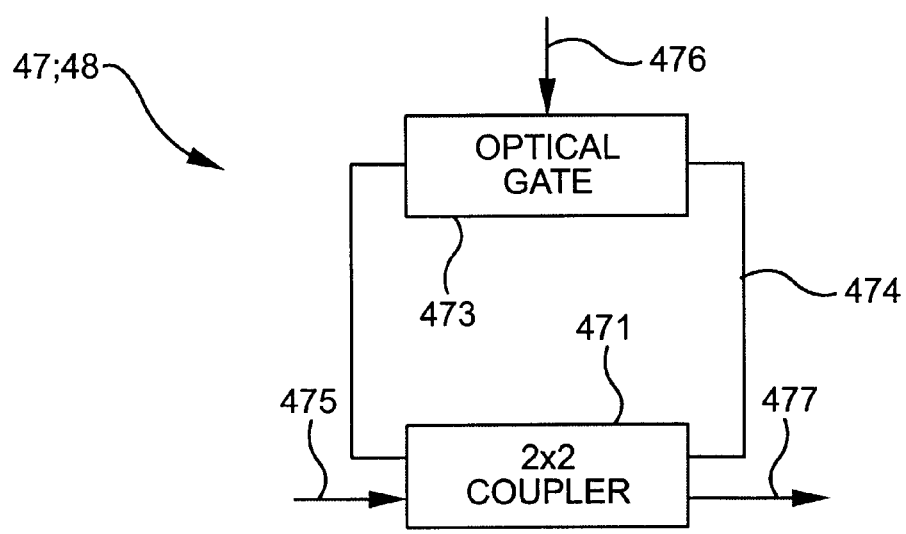
FIG. 7 is a schematic representation of a first embodiment of an optical flip-flop of the optical decision unit shown in FIG. 2.

For example, according to the embodiment shown in FIG. 7, each of the optical flip-flops 47 and 48 consists of a loop-type optical fibre structure 474 in which a conventional 2×2 coupler 471 and an optical gate 473 are connected. The coupler 471 is preferably of the 50/50 directional type and the optical gate 473 is, for example, of one of the types described previously. Additionally, each flip-flop has a first set input 475 for an input optical impulse (set), a second reset input 476 for an optical control impulse (reset) and an output 477. Following an optical set impulse at the input 475 and in the absence of the optical reset impulse, an output optical signal having substantially constant intensity is transmitted to the output 477 of the flip-flop. Conversely, in the presence of the optical reset impulse, no optical signal is transmitted to the output 477 of the flip-flop.

The optical set impulse is coupled to the structure 474 by means of the coupler 471 and the optical reset impulse is coupled by means of the control input 476 of the optical gate 473.

The coupler 471 divides the optical set impulse into two impulses having substantially the same intensity and transmits one of them into the loop structure 474 and the other to the output 477. In the absence of the optical reset impulse, the optical gate 473 is open and allows the optical set impulse to pass in the loop structure 474 to the coupler 471. Every time the optical set impulse transmitted into the loop structure 474 returns to the coupler 471, half of its intensity is again transmitted to the output and the other half into the loop structure 474. Preferably, the total length of the optical fibre loop structure 474 is selected in such a way that the optical set impulse which is made to circulate in it is subsequently transmitted to the output, at the tail of the preceding optical impulse transmitted to the output. In other words, the propagation time in the loop structure 474 is preferably equal to the duration of the optical set impulse. In this way, an optical signal having a duration equal to a multiple of the duration of the set impulse is transmitted to the output 477 of the flip-flop.

Additionally, the gain of the optical semiconductor amplifiers of the gate 473 is preferably selected in such a way as to compensate for the losses undergone by the optical set impulse during its propagation in the loop structure 474 and thus to ensure that the said output optical signal has a constant intensity.

In the presence of the optical reset impulse, the optical gate 473 is closed and thus interrupts the propagation of the said optical set impulse in the loop structure 474. Preferably, the optical reset impulse has a duration equal to that of the optical set impulse. In this way, the optical gate 473 remains closed for a sufficiently long time to extinguish the optical set impulse in the loop structure 474. Consequently, while the optical reset impulse is absent, the optical set impulse is continually retransmitted to the output, in such a way that an optical signal of virtually constant intensity is present at the output of the flip-flop. Following the arrival of the optical reset impulse, however, the transmission of the said optical signal to the output 477 of the flip-flop is blocked. At the output of the flip-flop, therefore, there is an output optical impulse which is temporally aligned with the arrival of the optical set impulse and has a duration equal to the difference between the time of arrival of the optical reset impulse and the preceding time of arrival of the optical set impulse.

According to one embodiment, an optical filter (not shown) is connected in the loop structure 474 to filter the ASE (Amplified Spontaneous Emission) generated by the optical amplifiers present in the optical gate 473 and to reduce the quantity of noise accumulated along the said loop structure 474. The said optical filter may be of the interference type such as a conventional reference filter, a Mach-Zehnder filter, an interference grating or a diffraction grating.

According to another embodiment, the optical flip-flops 47 and 48 may be of the type described in patent application EP 97122771 in the name of the present applicant. For example, as shown in FIG. 10, they may be formed in free space where the light beams are propagated in a vacuum or in the atmosphere between optical elements such as filters, prisms and mirrors.

Figure 10:
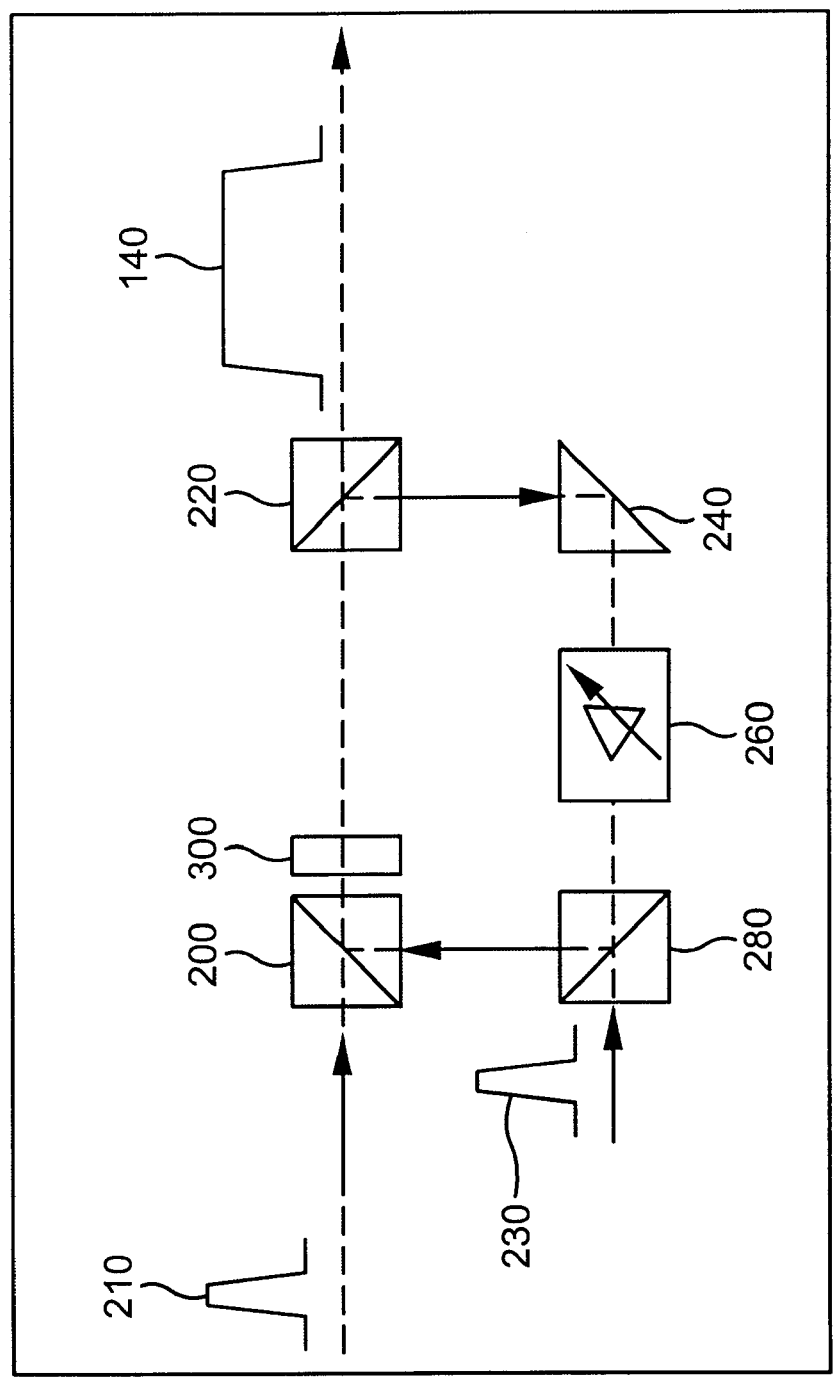
FIG. 10 is a schematic representation of a second embodiment of an optical flip-flop of the optical decision unit shown in FIG. 2.

According to the embodiment in FIG. 10, a flip-flop comprises a first optical beam splitter 200 having a first input for an optical set impulse 210, a second input and an output, a second optical beam splitter 220 having an input coupled optically to the output of the first optical beam splitter 200 and two outputs, a third optical beam splitter 280 having a first input coupled optically to an output of the second optical beam splitter 220 and a first output coupled optically to the second input of the first optical beam splitter 200 in such a way as to form a loop. The said optical beam splitter 280 also comprises a second input for an optical reset impulse 230 and a second output coupled optically to an optical amplifier 260 included in the said loop. The said optical beam splitters are, for example, conventional partially reflecting mirrors or conventional prisms. A reflecting element 240, such as a prism, a mirror or similar, optically couples the optical amplifier 260 to an output of the optical beam splitter 220. The said optical amplifier 260 is a conventional optical amplifier, for example of the fibre type doped with rare earths or of the semiconductor type.

Preferably, an optical filter 300 is connected in the loop 22 to filter the ASE (Amplified Spontaneous Emission) generated by the optical amplifier 260 and to reduce the quantity of noise accumulated along the loop. The said optical filter 300, as stated previously, may be of the interference type such as a conventional reference filter, a Mach-Zehnder filter, an interference grating or a diffraction grating.

The operation of this embodiment of the flip-flop is entirely analogous to that of the preceding one. An optical set impulse 210 input into the first optical beam splitter 200 enters the loop. The second beam splitter 220 divides the said optical set impulse into an optical signal 140 which leaves the loop and into an optical feedback signal which is transmitted to the optical amplifier 260. The optical feedback signal is amplified by the optical amplifier 260 and then retransmitted to the optical beam splitter 220 after two reflections by the optical beam splitters 280 and 200. The optical beam splitter 220 divides the optical feedback signal into a first portion, which maintains the output optical signal 140 even after the termination of the optical set impulse 210, and a second portion which is again transmitted along the loop. The output optical signal 140 is then interrupted by an optical reset impulse 230 which saturates the optical amplifier 260 and thus blocks the propagation of the optical feedback signal along the loop.

Preferably, in this case also the gain of the optical amplifier 260 is such that it compensates for the losses undergone by the optical feedback signal in the loop and the propagation time along the loop is equal to the duration of the set impulse 210.

In one embodiment, the wavelength of the optical reset impulse 230 is different from that of the optical set impulse 210. The filter 300 can thus be selected in such a way as to allow the wavelength of the optical set impulse 210 to pass and to stop that of the optical reset impulse 230, preventing the optical reset impulse 230 from being transmitted to the output.

Figure 11:
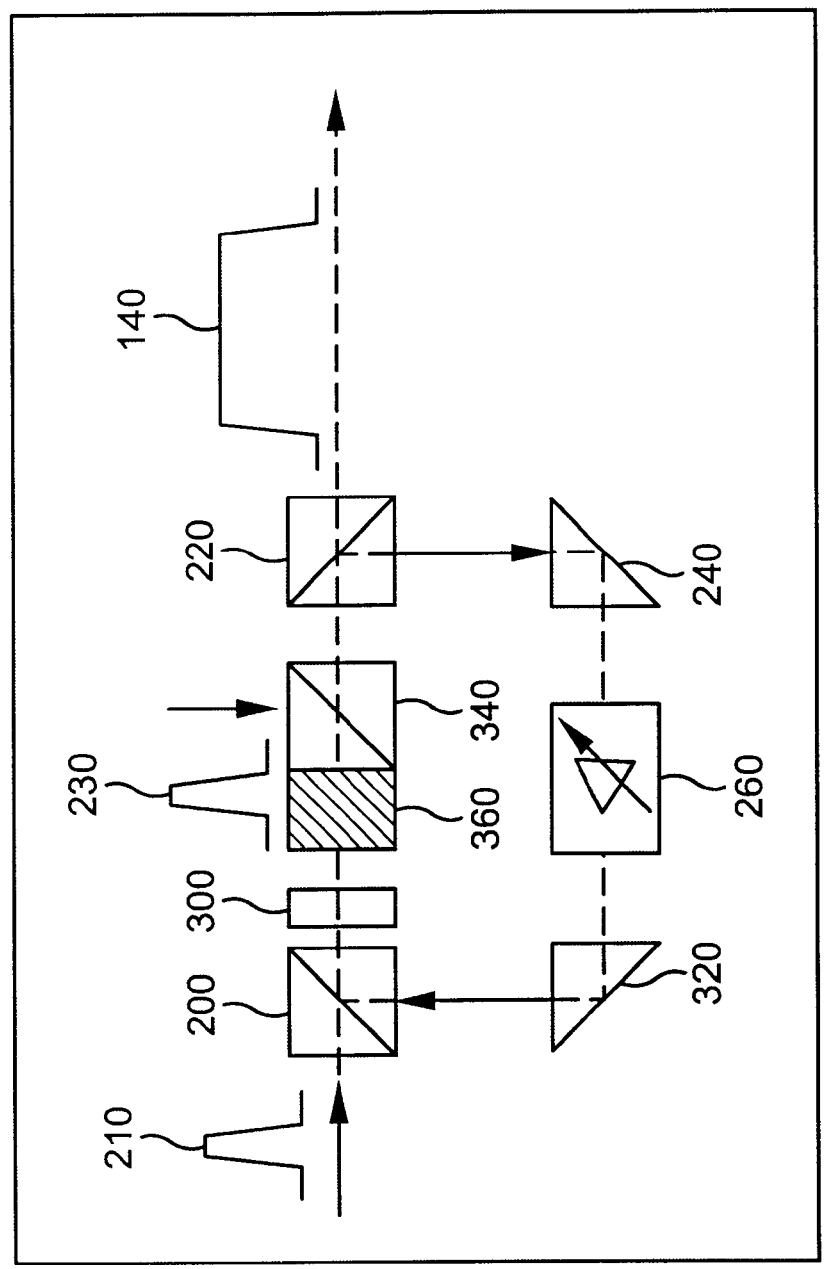
FIG. 11 is a schematic representation of a third embodiment of an optical flip-flop of the optical decision unit shown in FIG. 2.

According to a further embodiment shown in FIG. 11, the loop shown in FIG. 10 also comprises an optical gate 360, an optical beam splitter 340 for supplying the optical reset impulse 230 to the optical gate 360 and a reflecting element 320 in place of the optical beam splitter 280. The optical gate is, for example, of the same type as those described previously. The operating principle of this embodiment is entirely analogous to that of the preceding embodiment. With reference to an example of operation of the optical device 40, an optical impulse 222 at the input of the coupler 41 is divided into two optical impulses 444 and 333 of approximately equal intensity. The optical impulse 333 is transmitted along the connection 3 towards the constant delay unit 45 which delays it by a length of time equal to a predetermined time interval $T_C$. The optical impulse 333, delayed by the unit 45, is then divided into two further optical impulses 666 and 777 by the coupler 42. The first impulse 666 is transmitted to the set input of the flip-flop 48 through the connection 6, while the second impulse 777 is transmitted to the variable delay (T) unit 46 and then, through the connection 7, to the reset input of the said flip-flop 48. In this way, with a delay $T_C$ in the arrival of the control impulse 222 at the input of the optical device 40, the optical impulse 666 (the set impulse) causes the emission of an optical signal, at substantially constant intensity, from the output of the flip-flop 48. Then, after a delay T with respect to $T_C$, the optical impulse 777 (the reset impulse) blocks the transmission of the said optical signal to the output of the flip-flop 48.

In turn, the optical impulse 444 is transmitted along the connection 4 to the coupler 43, which produces an optical impulse 888 which, through the connection 8, arrives at the set input of the flip-flop 47, and an optical impulse 999 which, through the connection 9, arrives at the reset input of the said flip-flop 47. The said optical impulses 888 and 999 are temporally phase-shifted with respect to each other by a time $T_C$ by the constant delay unit 44. In this way with a negligible delay with respect to the interval of the said optical control impulse 222 at the input of the optical decision unit 40 the optical set impulse 888 causes the emission of an optical signal, at a substantially constant intensity, from the output of the flip-flop 47. On the other hand, the optical impulse 999 (the reset impulse), with a delay $T_C$ after the arrival of the said control impulse 222, blocks the transmission of the said optical signal to the output of the flip-flop 47.

Consequently, the optical device 40 generates, as a result of the optical control impulse 222 at the input, two optical impulses, of which the one at the output 52 has a duration of $T_C$ and is aligned temporally with the arrival of the optical control impulse 222 at the input; and the one at the output 51 has a duration of T and is delayed, with respect to the arrival of the optical control impulse 222 at the input, by a time equal to $T_C$.

The optical impulse from the output 51 of the optical device 40 forms the control signal for the input optical gate 10, while the optical impulse from the output 52 of the optical device 40 forms the control signal for the output optical gate 20. Consequently, in the presence of an optical impulse arriving, through the optical fibre connection 16, from the flip-flop 48, the input optical gate 10 changes its state from open to closed and maintains it until throughout the duration (T) of the said optical impulse. In turn, in the presence of an optical impulse arriving, through the optical fibre connection 15, from the flip-flop 47, the output optical gate 20 changes its state from closed to open and maintains it throughout the duration ($T_C$) of the said optical impulse.

FIGS. 9(a)–9(d) represent schematically the operation of the optical selector 8000 according to the invention. An ATM cell 1000 at the input of the selector 8000, characterized by a predetermined frequency f of arrival (cells per second), is transmitted from the input gate 10, which is normally in the open state, to the cell recognition device 30, through the connection 1. The cell recognition device 30 permits the passage of the cell 1000 along the connection 5 towards the output gate 20 and, when it recognizes that the header of an ATM cell is present at its input, generates a first optical impulse 222, temporally aligned with the header of the cell 1000, and transmits it to the optical device 40 through the connection 2 [FIG. 9(a)]. At this point, 1) with a negligible delay with respect to the generation of the optical impulse 222, the optical decision unit 40 generates a first optical signal at the output 52 which, through the connection 15, arrives at the output gate 20. The said first optical signal changes the state of the output gate 20 from closed to open and thus permits the passage of the cell 1000 from the output of the optical selector 8000 [FIG. 9(b)];

2) with a delay $T_C$, equal to the duration of the cell 1000, with respect to the generation of the optical impulse 222, the optical decision unit 40 p2 generates a second optical signal at the output 51 which, through the connection 16, arrives at the input gate 10. The said second optical signal changes the state of the input gate 10 from open to closed and thus prevents other incoming cells from entering the optical selector 8000 after all the bits of the cell 1000 have passed through the optical gate 10 [FIG. 9(c)]; and 3) with a further delay $T$ [$T=(1/PCR)-T_C$] with respect to $T_C$, the optical decision unit 40 again causes the opening of the input gate 10 (interrupts the emission of the said second optical signal). Therefore, if a second cell 2000 arrives in the optical selector 8000 before a time interval $T_{PCR}=1/PCR=T_C+T$ has elapsed after the arrival of the first cell 1000 (has an arrival frequency f>PCR), the input gate 10, being still in the closed state, prevents it from entering the optical selector 8000 [FIG. 9(d)]. Additionally, even if, when the input gate 10 changes its state from closed to open, some of the bits of the second cell 2000 are still at the input of the gate 10, the said bits are not recognized by the cell recognition device 30 as the header of an ATM cell and, therefore, the optical impulse 222 is not transmitted to the optical decision unit 40. Consequently the latter does not cause the output gate 20 to open and does not permit the said remaining part of the cell 2000 to pass to the output of the optical selector 8000. In this way, even if incomplete cells of bits enter the optical selector 8000, they cannot then emerge from it.

To summarize, incoming bits can, in normal conditions, enter the optical selector 8000 through the gate 10 (which is in the open state) and reach the gate 20, passing through the cell recognition device 30;

until the cell recognition device 30 recognizes the header of an ATM cell, the initial state of the selector 8000 is maintained (gate 10 open and gate 20 closed), and the incoming bits are thus blocked at the output (destructive interference in the output gate 20);

on the other hand, when the cell recognition unit 30 recognizes the header of an ATM cell, i. the cell recognition unit 30 transmits the optical impulse 222 along the connection 2; and the optical decision unit 40 ii. causes the output gate 20 to open immediately after the arrival of the optical impulse 222 (to permit the output of the recognized ATM cell) and keeps it open for a time interval equal to $T_C$ (to enable all the bits of the ATM cell to pass through the gate 20);

iii. causes the input gate 10 to close after a time $T_C$ (to enable all the bits of the cell 1000 to pass through the gate 10) and keeps it closed for a time interval equal to T (to prevent new incoming cells at the input of the optical selector 8000, with f>PCR, from entering the optical selector).

For this reason, with respect to the arrival of the optical impulse 222 at the input 50 of the optical decision unit 40, the set impulse 888 is not delayed;

the reset impulse 999 is delayed by a fixed delay equal to the duration $T_C$ of the cell 1000;

the set impulse 666 is delayed by a fixed delay equal to the duration $T_C$ of the cell 1000;

the reset impulse 777 is delayed by a total delay equal to $T_{PCR}$, and by a delay equal to T with respect to the set impulse 666.

Since $T[T=(1/PCR-T_C)]$, as seen previously, depends on the PCR negotiated between the source and the ATM network, the value of this delay is preferably modifiable by means of the variable delay unit 46.

On the other hand, since the duration $T_C$ of an ATM cell is fixed, the delays $T_C$ are typically obtained by means of the constant delay units 44 and 45.

The optical selector 8000 according to the invention can therefore be used to permit the passage to the output of only those ATM cells which arrive at its input with a time interval, with respect to each other, greater than or equal to $T_{PCR}$ (they arrive with a frequency f≦PCR) and thus to provide a wholly optical checker for ATM networks.

The optical selector 8000 is also capable of eliminating, in the output gate 20, the bits which enter from the input gate 10 but which are not subsequently recognized by the ATM cell recognition unit 30.

What is claimed is:

1. An optical selector for an asynchronous transfer mode (ATM) optical network, the said selector being capable of selecting ATM cells of bits having a frequency of arrival f less than or equal to a predetermined frequency (PCR), the said optical selector comprising:

an input having a first device capable of blocking the entry of bits;

an output having a second device capable of permitting the outflow of bits;

an ATM cell recognition unit constructed in such a way that it recognizes the headers of ATM cells and connected to the said input and to the said output for the transit of bits from the said input to the said output; and an optical decision unit connected operationally to the said first device, to the said second device and to the said ATM cell recognition unit.

2. An optical selector according to claim 1, characterized in that the said first device consists of a first optical gate.

3. An optical selector according to claim 2, characterized in that the said first optical gate is in the open state when it is in normal operating conditions.

4. An optical selector according to any of the preceding claims 1 to 3, characterized in that the said second device consists of a second optical gate.

5. An optical selector according to claim 4, characterized in that the said second optical gate is in the closed state when it is in normal operating conditions.

6. An optical selector according to claim 1, characterized in that the said ATM cell recognition unit is an optical device capable of sending an optical impulse to the said optical decision unit when it recognizes the header of an ATM cell.

7. An optical selector according to claim 6, characterized in that the said optical decision unit processes the said optical impulse to supply a first optical control signal for the said first device, the said first optical control signal being capable of changing the state of the said first optical gate from open to closed for a time substantially equal to T, starting from when a time substantially corresponding to the duration $T_C$ of an ATM cell has elapsed since the recognition of the header of an ATM cell.

8. An optical selector according to claim 6, characterized in that the said optical decision unit processes the said optical impulse to supply a second optical control signal for the said second device, the said second optical control signal being capable of changing the state of the said second optical gate from closed to open for a time substantially equal to the duration $T_C$ of an ATM cell, starting from the time of recognition of the header of an ATM cell by the said ATM cell recognition unit.

9. An optical selector according to claim 7, characterized in that the said optical decision unit also comprises a first output for the said first optical control signal connected to the said first device.

10. An optical selector according to any of claims 7 to 9, characterized in that the said optical decision unit also comprises a second output for the said second optical control signal connected to the said second device.

11. A method for selecting ATM cells of bits having a frequency of arrival, f, less than or equal to a predetermined frequency (PCR), the said method comprising:

a) the input of bits through suitable open input means, b) the passage of the said bits through an ATM cell recognition unit capable of recognizing the headers of ATM cells, towards suitable closed output means;

c) the sending of a command, when the header of an ATM cell is recognized by the said ATM cell recognition unit, i) for the opening of the said output means for a time substantially equal to the duration ($T_C$) of an ATM cell and, at the end of this time $T_C$, ii) for the closing of the said input means for a time $T=1/PCR-T_C$, d) the maintenance of the initial state, if the header of an ATM cell is not recognized by the said ATM cell recognition unit, in such a way that the said input means remain open for the input of an ATM cell and the said output means remain closed, thus eliminating the bits which have entered and whose header has not been recognized.

12. A method according to claim 11, characterized in that the step c) also comprises providing a first optical control impulse for the said output means and a second optical control impulse for the said input means.

13. A method according to claim 12, characterized in that the said first optical control impulse has a duration substantially equal to $T_C$, starting from the moment of recognition of the header of an ATM cell.

14. A method according to claim 12 or 13, characterized in that the said second optical control impulse has a duration substantially equal to T, starting from the moment when a time substantially equal to $T_C$ has elapsed since the recognition of the header of an ATM cell.

* * * * *